(12) United States Patent
Vadgaonkar et al.

(10) Patent No.: US 10,716,171 B2
(45) Date of Patent: Jul. 14, 2020

(54) POWER EFFICIENT HEATER CONTROL OF AIR DATA SENSOR

(71) Applicant: Rosemount Aerospace Inc., Burnsville, MN (US)

(72) Inventors: Prashant Vadgaonkar, Karnataka (IN); Gaurav Sahay, Karnataka (IN); Daniel Higgins, Lakeville, MN (US)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 11 days.

(21) Appl. No.: 16/037,121

(22) Filed: Jul. 17, 2018

(65) Prior Publication Data

US 2019/0297675 A1   Sep. 26, 2019

(30) Foreign Application Priority Data

Mar. 23, 2018   (IN) .............................. 201811010827

(51) Int. Cl.
| | |
|---|---|
| *G01P 5/165* | (2006.01) |
| *G01P 13/02* | (2006.01) |
| *H05B 1/02* | (2006.01) |
| *G05D 23/27* | (2006.01) |
| *G01P 21/02* | (2006.01) |

(52) U.S. Cl.
CPC ............ *H05B 1/0236* (2013.01); *G01P 5/165* (2013.01); *G01P 13/025* (2013.01); *G01P 21/025* (2013.01); *G05D 23/27* (2013.01)

(58) Field of Classification Search
None
See application file for complete search history.

(56) References Cited

U.S. PATENT DOCUMENTS

| | | | |
|---|---|---|---|
| 5,313,202 A | 5/1994 | Hansman, Jr. et al. | |
| 5,464,965 A * | 11/1995 | McGregor | G05D 23/2401 |
| | | | 219/481 |

(Continued)

FOREIGN PATENT DOCUMENTS

| | | |
|---|---|---|
| DE | 102008063408 A1 | 7/2010 |
| DE | 102013223568 A1 | 5/2015 |

(Continued)

OTHER PUBLICATIONS

Partial Search Report for European Application No. 19164158.8; Application Filing Date Mar. 20, 2019; dated Aug. 2, 2019 (15 pages).

(Continued)

*Primary Examiner* — Harshad R Patel
(74) *Attorney, Agent, or Firm* — Cantor Colburn LLP (57) ABSTRACT

An aircraft includes an air data sensor and a heating element. The air data sensor includes a probe and transducer coupled to the probe. The heating element is disposed within the probe and is configured to emit heat that heats the probe. The aircraft further comprises a heater control system in signal communication with the heating element and a thermal sensor system. The thermal sensor system is configured to determine the emitted heat from the heating element based on the thermal radiation of heat released from a surface of the probe. In this manner, the heater control system can actively vary the temperature of the heating element based on the emitted heat from the heating element.

8 Claims, 7 Drawing Sheets

(56) References Cited

U.S. PATENT DOCUMENTS

| | | | |
|---|---|---|---|
| 6,070,475 A | 6/2000 | Muehlhauser et al. | |
| 6,414,282 B1 * | 7/2002 | Ice | G05D 23/1913 |
| | | | 219/209 |
| 6,430,996 B1 | 8/2002 | Anderson et al. | |
| 7,597,018 B2 | 10/2009 | Braun et al. | |
| 7,784,739 B2 | 8/2010 | Nichols | |
| 7,854,548 B2 | 12/2010 | Sandnas et al. | |
| 8,060,334 B1 * | 11/2011 | Jarvinen | B64D 15/12 |
| | | | 340/582 |
| 2004/0261518 A1 | 12/2004 | Seidel et al. | |
| 2011/0290784 A1 | 12/2011 | Orawetz et al. | |
| 2014/0263260 A1 * | 9/2014 | Duncan | E01H 5/10 |
| | | | 219/201 |
| 2015/0344137 A1 | 12/2015 | Bartz et al. | |
| 2017/0334574 A1 * | 11/2017 | Wilson | B64D 45/00 |

FOREIGN PATENT DOCUMENTS

| | | | |
|---|---|---|---|
| EP | 2848945 A1 | 3/2015 | |
| WO | 0034839 A1 | 6/2000 | |

OTHER PUBLICATIONS

Extended European Search Report for European Application No. 19164158.8; Application Filing Date Mar. 20, 2019; dated Dec. 17, 2019 (13 pages).

* cited by examiner

POWER EFFICIENT HEATER CONTROL OF AIR DATA SENSOR

CROSS-REFERENCE TO RELATED APPLICATIONS

This application claims the benefit of Indian Application No. 201811010827 filed Mar. 23, 2018, which is incorporated herein by reference in its entirety.

BACKGROUND

Exemplary embodiments pertain generally to the art of aircraft systems, and more particularly, to aircraft pressure measurement systems.

Aircraft pressure measurement system include an air data sensor to determine airspeed, altitude and angle of attack. These air data sensors are typically constructed as a Pitot static probe and transducer. The probe utilizes small openings or apertures on the front and sides of the probe body to direct air pressure to the transducer, which in turn facilitates air pressure measurements. Commercial and military aircraft commonly fly in environmental conditions where ice can form on the Pitot static probe surface and openings. This ice formation has the potential to disturb the pressure measurement reading or completely block the probe openings. The result is incorrect or erroneous pressure measurement data being sent to the aircraft flight control systems or pilot.

BRIEF DESCRIPTION

According to a non-limiting embodiment, an aircraft includes an air data sensor and a heating element. The air data sensor includes a probe and transducer coupled to the probe. The heating element is disposed within the probe and is configured to emit heat that heats the probe. The aircraft further comprises a heater control system in signal communication with the heating element and a thermal sensor system. The thermal sensor system is configured to determine the emitted heat from the heating element based on the thermal radiation of heat released from a surface of the probe. In this manner, the heater control system selectively activates and deactivates the heating element based on the emitted heat from the heating element.

According to another non-limiting embodiment, an aircraft comprises an air data sensor and a heating element. The air data sensor includes a probe and transducer coupled to the probe. The heating element is disposed within the probe and is configured to emit heat that heats the probe. The heating element is configured to emit heat that heats the probe. The aircraft further comprises a thermal sensor system in signal communication with a diagnostic system. The thermal sensor system is configured to determine the emitted heat from the heating element based on thermal radiation of heat released from a surface of the probe. The diagnostic system is in signal communication with the thermal sensor system and the heating element. The diagnostic system is configured to determine the temperature of the heating element and initiate a heater diagnostic test that diagnoses the health of the heating element based on the temperature of the heating element.

According to yet another non-limiting embodiment, an aircraft heater control system includes an air data sensor, and a heating element coupled to the air data sensor. The heating element is configured to emit heat, which increases the temperature of the air data sensor. A thermal sensor system is located adjacent to the air data sensor and is configured to output a temperature signal indicative of a temperature of the heating element. An electronic hardware controller is in signal communication with the thermal sensor and the heating element. The controller is configured to selectively activate and deactivate the heating element based on the temperature of the heating element.

According to still another non-limiting embodiment, a method is provided to heat an air data sensor operable with an aircraft. The method comprises outputting, via a thermal sensor system in operable communication with a heating element disposed within a probe of an air data sensor, a temperature signal indicative of a temperature of the heating element based on a thermal radiation of heat released from a surface of the probe. The method further comprises controlling power supplied to the heating element, via a controller, to vary the emitted heat based on the temperature signal.

According to another non-limiting embodiment, a diagnostic system for an aircraft comprises an air data sensor including a probe and transducer coupled to the probe, and a heating element disposed within the probe and configured to emit heat that heats the probe. The diagnostic system further includes a thermal sensor system in operable communication with the air data sensor and configured to determine output a temperature signal indicative of a temperature of the heating element. The diagnostic system further includes a controller in operable communication with the heating element and the thermal sensor system. The controller is configured to determine the temperature of the heating element based on the temperature signal, and to initiate a heater diagnostic test that diagnoses a health of the heating element based on the temperature of the heating element.

According to still another non-limiting embodiment, a method is provided to diagnose a heating element coupled to an air data sensor operable with an aircraft. The method comprises emitting heat from the heating element coupled to a probe of the air data sensor to increase a temperature of the probe, and outputting, via a thermal sensor system, a temperature signal indicative of a temperature of the heating element. The method further comprises determining, via a controller, the temperature of the heating element based on the temperature signal, and initiating a heater diagnostic test that diagnoses a health of the heating element based on the temperature of the heating element.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Various embodiments described herein provide an aircraft pressure measurement system that includes an air data sensor. In at least one embodiment, the air data sensor is constructed as a Pitot probe and a transducer. A heating element is disposed within the probe and emits heat in response to a supplied electrical current. The heat from the heating element aims to prevent ice from forming on the probe, or to melt ice that has already formed on the probe during low temperature conditions. In at least one embodiment, the heat emitted from the heating element heats the probe and probe surface without heating the transducer.

In at least one embodiment, the pressure measurement system further includes a power efficient heater control system in signal communication with the transducer and the heating element. The heater control system implements an optics system capable detecting infrared (IR) heat emitted by the heating element. The heater control system utilizes the detected IR heat to dynamically or actively energize the heating element. Accordingly, the heater control system can determine more precisely when to energize the heating element and the amount of heat that should be produced by the heating element at given environmental conditions and temperatures. In this manner, heating efficiency and optimizing power consumption of the heating element is improved. The heater control system also provides diagnostics operations capable of determining the onset of a degrading heating element. In this manner, the heater control system can more accurately identify a faulty heating element, while also avoiding preemptive replacement and/or of the heating element.

Figure 1:
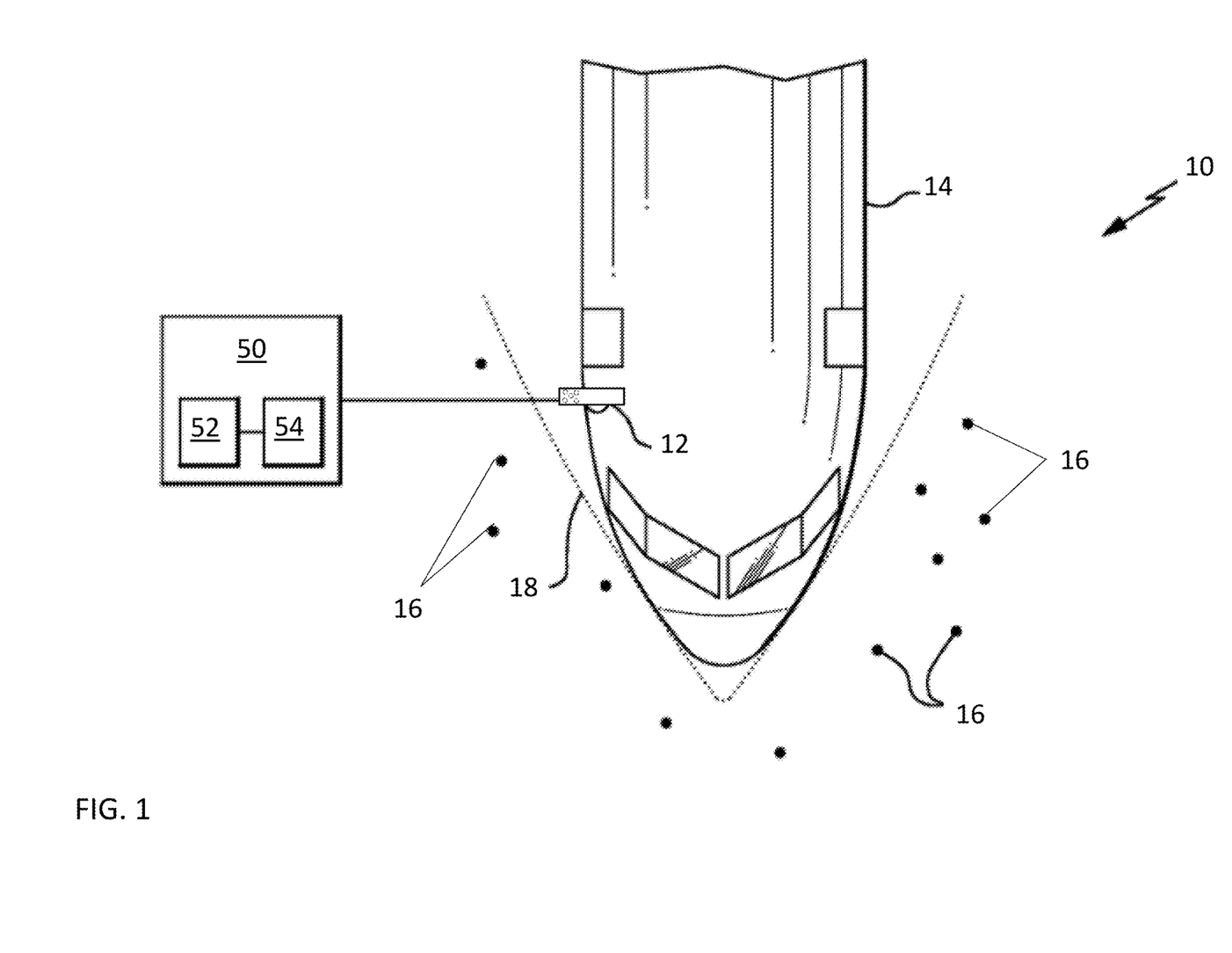
FIG. 1 is a partial view of an aircraft including an air data sensor according to a non-limiting embodiment.

With reference now to FIG. 1, an aircraft 10 including an air data sensor 12 is illustrated according to a non-limiting embodiment. An electronic hardware controller 50 is in signal communication with the air data sensor 12. The electronic hardware controller 50 includes a processor 52 and a memory unit 54. The memory unit 54 can store various algorithms, and data such as, threshold values, look-up tables, thermal models, etc. The processor 52 can execute the algorithms that may utilize the stored data to operate the control system and/or perform various diagnostic operations described herein.

Figure 2:
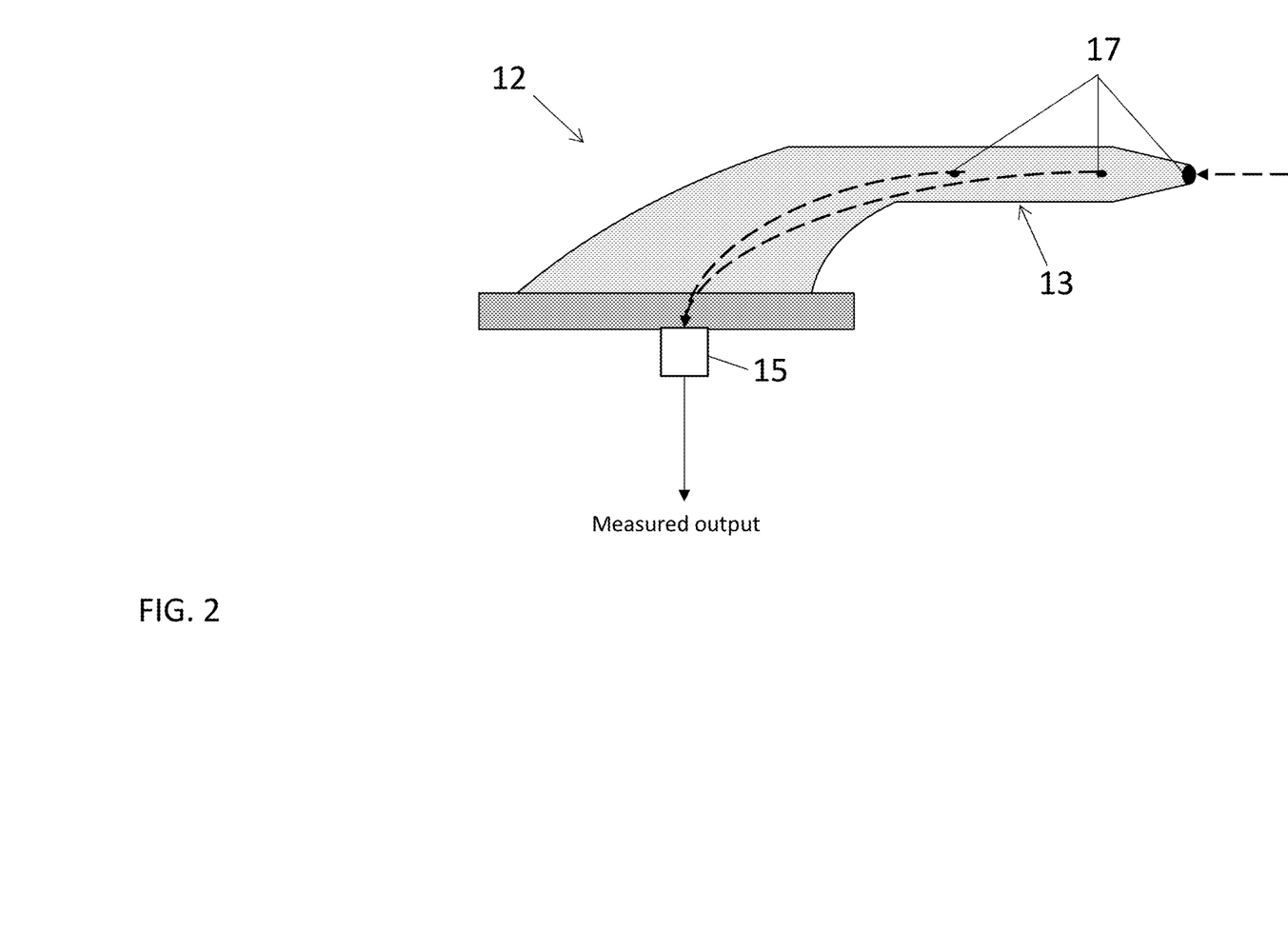
FIG. 2 illustrates an air data sensor including a probe coupled to a transducer according to a non-limiting embodiment.
Figure 3:
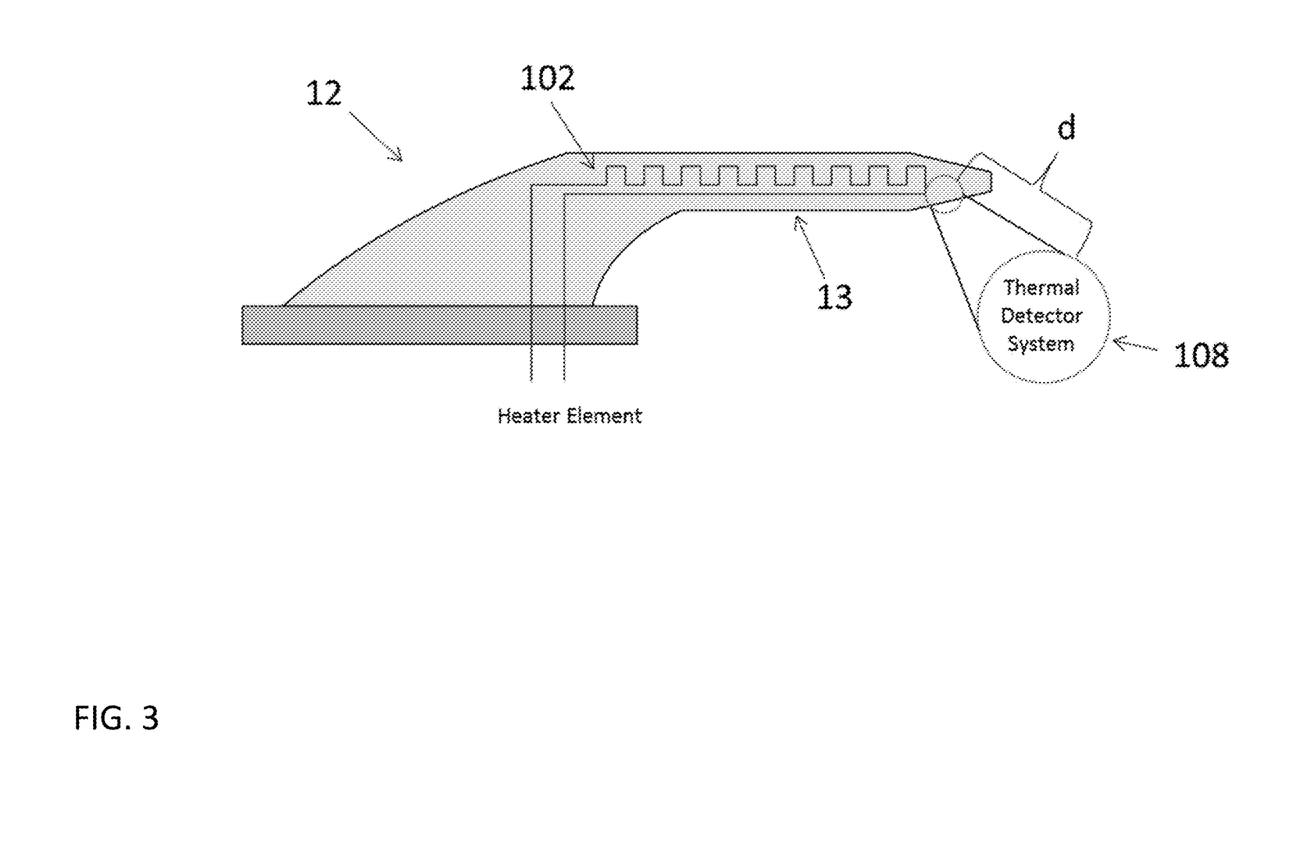
FIG. 3 is a cross-sectional view of the air data sensor of FIG. 2 showing a heating element embedded within the probe.

Referring to FIGS. 2 and 3, the air data sensor 12 can be constructed as a Pitot probe 13 coupled to a transducer 15. The probe 13 can be mounted to the body 14 of the aircraft 10, and can include one or more small openings or apertures 17 on the front and sides of the probe body to direct air pressure to the transducer 15. The transducer 15, in turn, can provide air pressure measurements to the controller 50. Although the air data sensor 12 is described going forward, it should be appreciated that other types of air data sensors configured to measure air data such as temperature, pressure, moisture, etc. may be implemented without departing from the scope of the invention.

Referring again to FIG. 1, it should also be appreciated that the probe 13 is not limited to any particular location. As can be appreciated, the aircraft 10 may be located in a high-altitude environment, which may contain High Altitude Ice Crystals and/or super cooled liquid water droplets. As a result, the probe 13 may encounter High Altitude Ice Crystals 16 and other types of ice while the aircraft 10 travels through the air 18. Although only a single probe 13 is shown, other examples may include coupling the controller 50 to more than one probe 13 installed on the aircraft 10, or other types of sensors installed on same aircraft 10 such as, for example, altitude sensors, speed sensors, etc.

Figure 4:
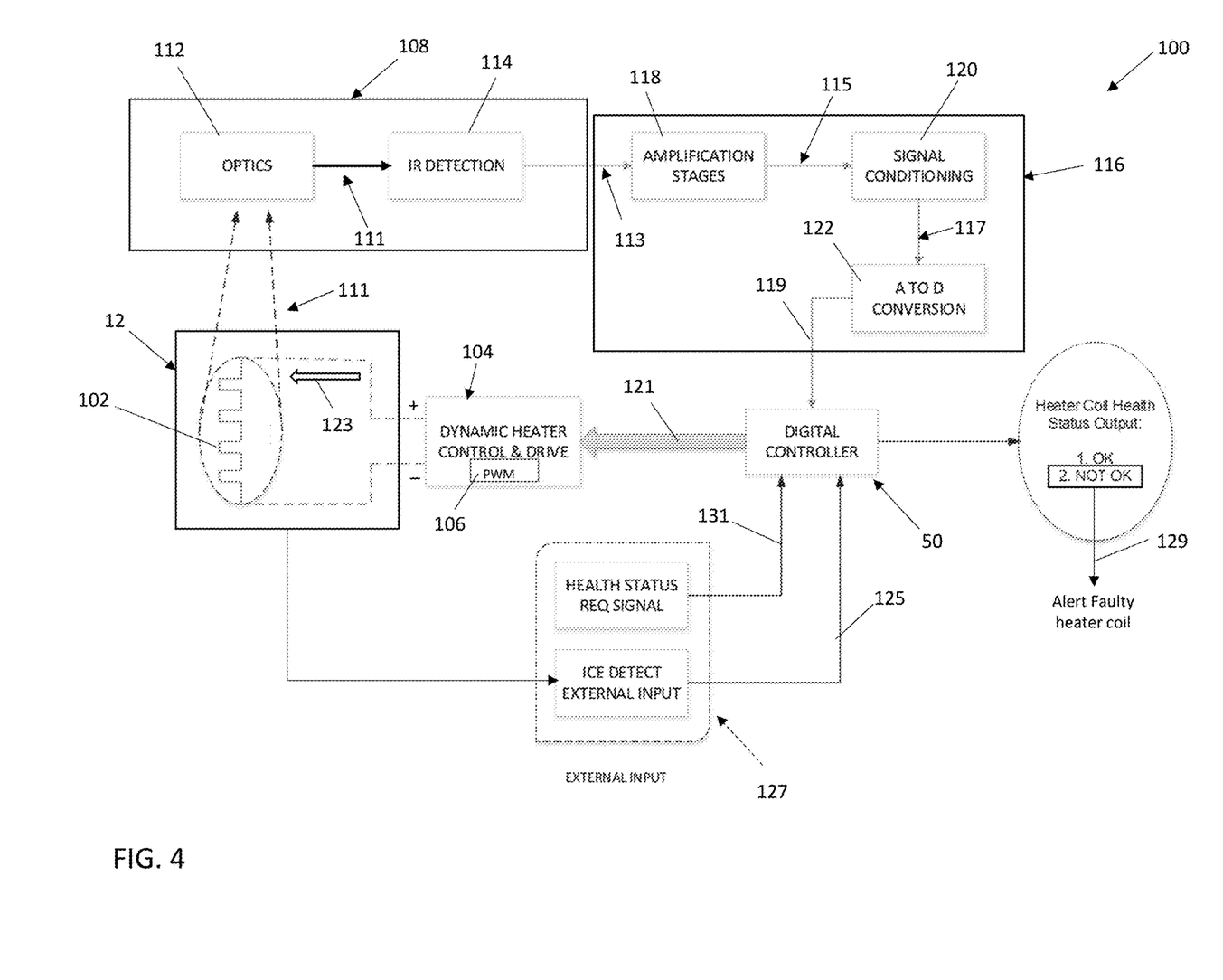
FIG. 4 is a block diagram of a heater control system according to a non-limiting embodiment.

Turning now to FIG. 4, a power efficient heater control system 100 installed on the aircraft 10 is illustrated according to a non-limiting embodiment. As described herein, the aircraft 10 comprises an air data sensor 12 which can includes a probe 13 such as a Pitot probe, coupled to a transducer 15. A heating element 102 is coupled to probe 13 and is configured to emit heat that heats the probe 13 and probe surfaces. In at least one embodiment, the heating element 102 is constructed as a heating element 102 embedded within the probe 13. The heating element 102 can be constructed, for example, as an electrically resistive coil, which emits the heat in response to an electrical current that flows therethrough. In at least one embodiment, the heating element 102 is in signal communication with a current drive circuit 104. The current drive circuit 104 includes a pulse-width modulation (PWM) circuit 106 that generates a pulsed control signal, which induces current flow through the heating element 102. The duty cycle of the pulsed control signal determines the level of the current. That is, as the duty cycle increases the current increases, and vice versa.

The heater control system 100 includes a thermal sensor system 108, a signal processing unit 116, and an electronic hardware controller 50. The thermal sensor system 108 is located remotely from the heating element 102, but without contacting the probe 13. In at least one embodiment, the thermal sensor system 108 is located away from the probe 13 at a distance (d) ranging, for example, from about 12 centimeters (cm) (or about 5 inches) to about 38 cm (or about 15 inches). In at least one embodiment, the thermal sensor system 108 is constructed as a pyrometer 108, which includes an optical unit 112 and a thermal detector 114. The optical unit 112 is configured to direct and focus thermal radiation (also referred to as IR radiation flux) 111 of heat released from the probe surface to the thermal detector 114. The thermal detector 114 is configured to output a temperature signal 113 indicative of a temperature of the heating element 102 based on the thermal radiation 111. In at least one embodiment, the thermal detector 114 includes an infrared (IR) sensor configured to measure the IR radiation flux of the emitted heat. Accordingly, the output temperature signal generated by the thermal detector 114 is related to the thermal radiation or irradiance ($E_e$) of the heating element 102 through the Stefan-Boltzmann law, the constant of proportionality, also referred to as the Stefan-Boltzmann constant (σ), and the emissivity (ε) of the heating element 102. The thermal transfer function of the heat released from the surface of the probe 13 can indicate the heat emitted by the heating element 102.

The signal processing unit 116 is configured to process the temperature signal 113 and convert the temperature signal 113 into a digital temperature signal 119 indicating the temperature of the heating element 102. In at least one embodiment, the signal processing unit 116 includes an amplification stage 118, a signal conditioning stage 120, and an analog-to-digital (A/D) converter 122. The amplification stage 118 includes one or more amplifier circuits configured to amplify the temperature signal 113, thereby generating an amplified temperature signal 115. The signal conditioning stage 120 includes one or more filter circuits configured to remove electrical noise from the amplified temperature signal 115 to generate a filtered analog temperature signal 117. The A/D converter 122 is configured to convert the filtered analog temperature signal 117 into the digital temperature signal 119.

The controller 50 is in signal communication with the thermal sensing unit 108 via the signal processing unit 116 and is in signal communication with the heating element 102 via the current drive circuit 104. The controller 50 is configured to selectively output a control signal 121 based on the digital temperature signal 119 so as to actively vary the temperature of the heating element based on the emitted heat from the heating element. In at least one embodiment, actively varying the temperate of the heating element includes selectively activating and deactivating the pulse width modulating (PWM) circuit 106, thereby actively generating the electrical current 123 necessary to energize the heating element 102. In another example, the parameters of the PWM control signal output form the PWM circuit 106 can be varied so as to adjust the level of current delivered to the heating element 102. In either case, the controller 50 can actively heat the air data sensor as the temperature of the heating element 102 actively changes (i.e., increases and decreases).

Figure 5:
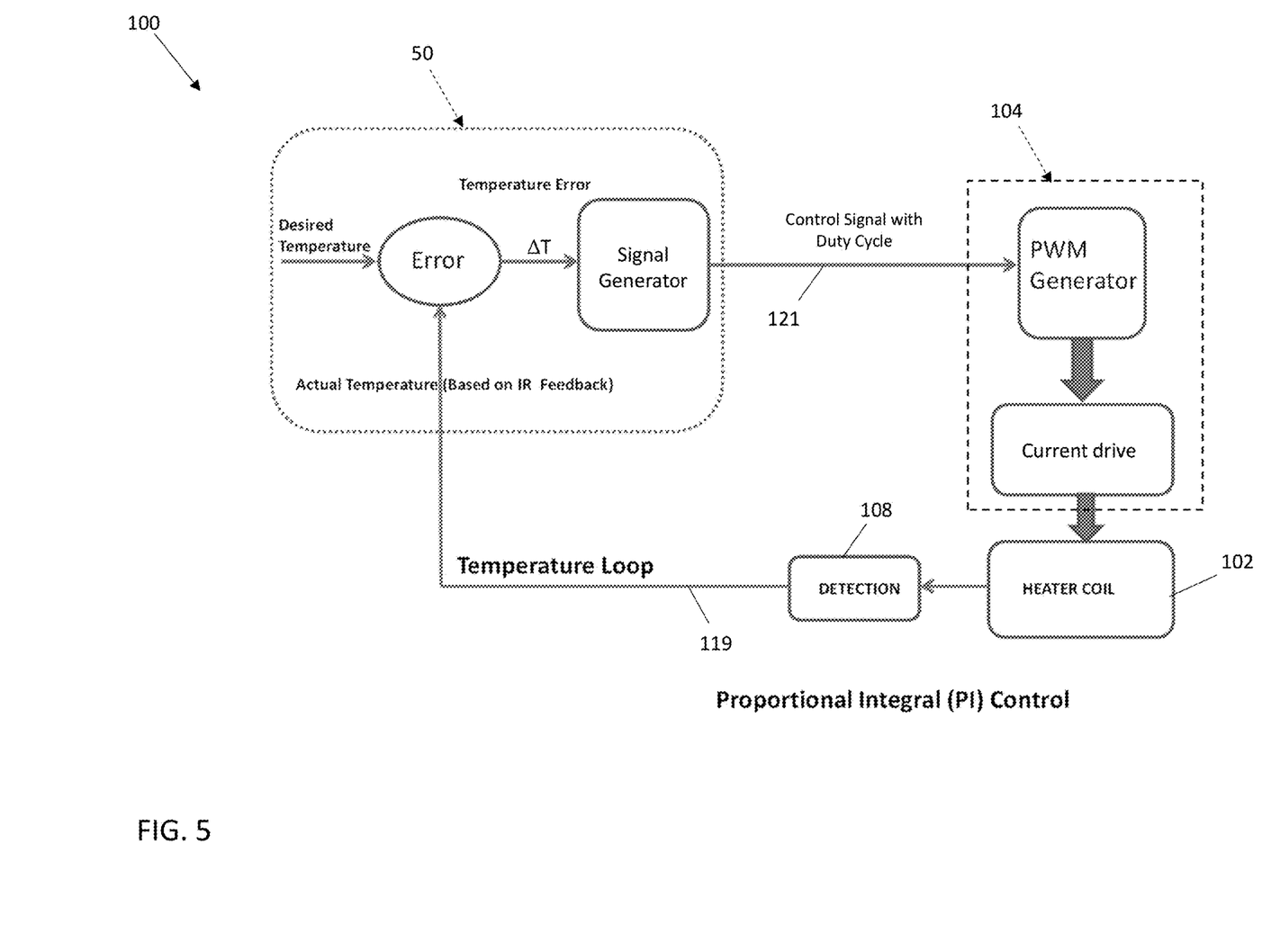
FIG. 5 is a block diagram illustrating a control feedback for controlling a heating element for heating the air data sensor according to a non-limiting embodiment.

In at least one embodiment, the controller 50 outputs the control signal 121 based a comparison between the digital temperature signal 119 and a target temperature value. Referring to FIG. 5, for example, the controller 50 outputs the control signal 121 when a temperature difference (ΔT), i.e., "error", between the heating element temperature (e.g., as indicated by the digital temperature signal 119) and a target temperature value (i.e., desired temperature) exceeds a temperature error threshold value. On the other hand, the controller 50 disconnects the control signal 121 when the temperature difference equals or falling below the temperature error threshold value.

In at least one embodiment, the controller 50 can also receive a secondary ice detection signal 125. Referring again to FIG. 4, the controller outputs the control signal 121 to activate the heating element 102 in response to receiving the secondary ice detection signal 125. The secondary ice detection signal 125 can be output from the probe 13 in response to detecting ice crystals in the air or ice buildup on the probe 13, from external input 127, or from another signal source. It should be appreciated that secondary ice detection signal 125 can serve as a secondary means of activating the heating element 102, and that the heater control system 100 can activate or deactivate the heating element 102 independently from the secondary ice detection signal 125. For example, the heater control system 100 can actively operate the heating element 102 as described above prior to the formation of ice in the air and/or on the probe 13.

The heater control system 100 is not only capable of actively controlling the heating element 102, but is also capable of diagnosing the operation and health of the heating element 102. With reference again FIG. 4, the controller 50 is configured to initiate a heater diagnostic test in response to receiving a health status request signal 131. Although the health status request signal 131 is illustrated as being generated by an external input 127, it should be appreciated that the heater diagnostic test can be initiated by an internal signal generated by the controller 50 according to a predetermined schedule and/or another condition. The heater diagnostic test diagnoses the health of the heating element 102 based on the emitted heat detected by the thermal sensing unit 108. The health of the heating element 102 can be viewed as a deterioration of the heating element's ability to sufficiently emit heat.

In at least one embodiment, the controller 50 determines a rate at which the heating element's temperature changes starting from a first time period and ending at a second time period. The first time period is set when the heating element 102 is first activated and the second time period is set when the temperature of the heating element 102 (i.e., as indicated by the digital temperature signal 119) reaches a target temperature. In at least one embodiment, the target temperature is actively determined based on a current environmental temperature measured by a temperature sensor and/or a current altitude of the aircraft 10. The temperature sensor can include a Total Air Temperature (TAT) probe and/or an Outside Air Temperature (OAT) probe.

The controller 50 compares the temperature change rate to a target temperature change rate to determine a temperature change rate differential, and diagnoses the health of the heating element 102 based on a difference between the temperature change rate differential and a differential threshold. In this manner, the controller 50 determines that the heating element 102 is faulty when the difference falls outside the differential threshold. In response to detecting a faulty heating element 102, the controller 50 can increase the duty cycle of the control signal generated by the PWM circuit 106, thereby increasing the current flowing through the heating element 102 so as to compensate for the heating element's reduced capability to emit heat. The controller 50 can also generate an alert signal 129 that activates an alert (e.g., an alarm, light indicator, dashboard icon, etc.) indicating a faulty or degraded heating element 102 is due for maintenance and/or replacement.

Figure 6:
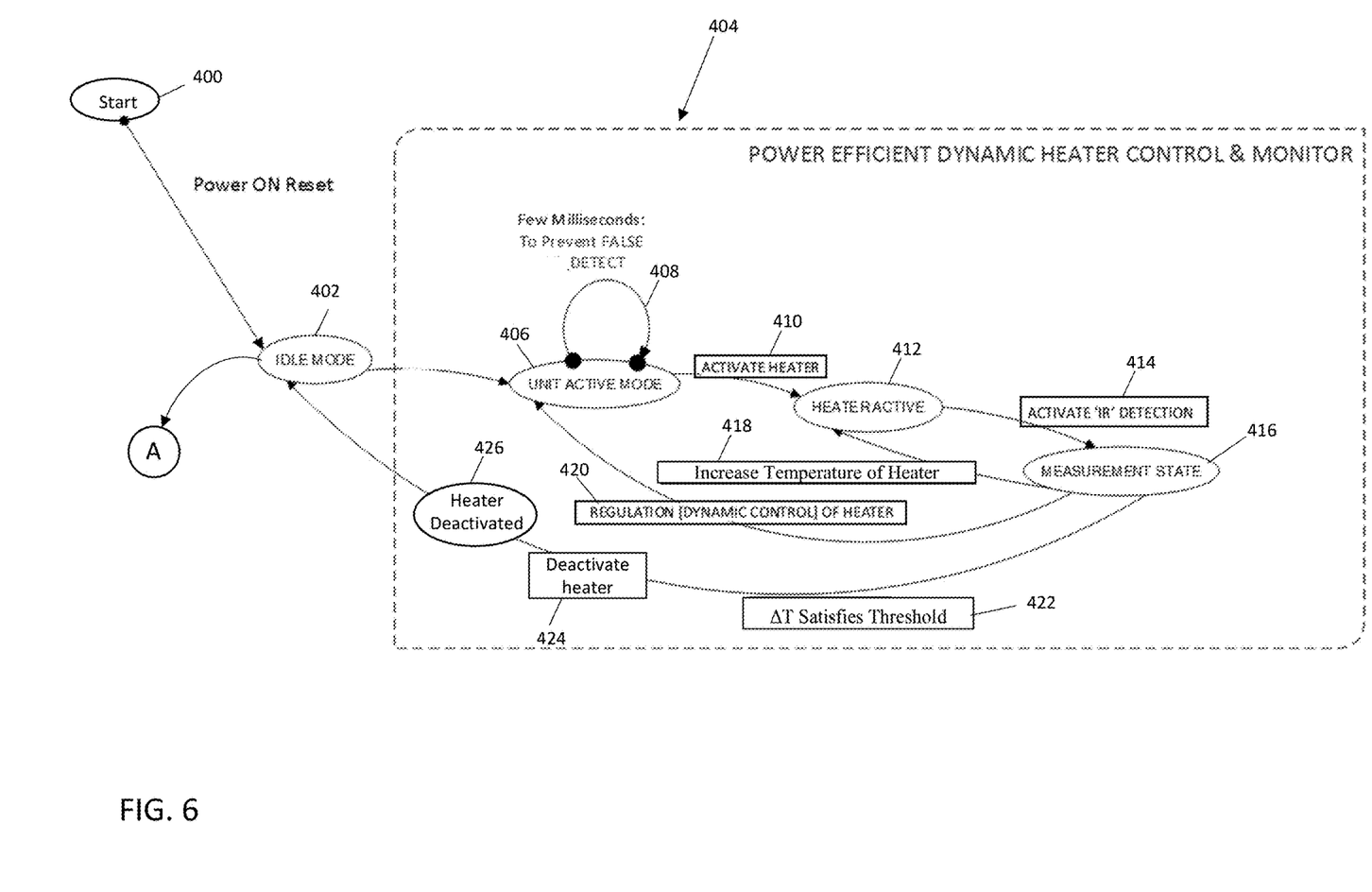
FIG. 6 is a flow diagram illustrating a method of heating an air data sensor installed on an aircraft is illustrated according to a non-limiting embodiment.

Turning now to FIG. 6, a method of controlling a heating control system to heat an air data sensor installed on an aircraft is illustrated according to a non-limiting embodiment. The method begins at operation 400, and proceeds to an idle mode 402 after initial power on reset of the air data sensor. At the idle mode 402, the method determines whether to invoke a heater control algorithm 404 or a heater diagnostic algorithm 500 (see FIG. 7). When the heater control algorithm 404 is invoked, the method proceeds to operation 406 and initializes the heater control system. In at least one embodiment, the heater control system remains in an idle state 408 (e.g., for a 2-5 milliseconds) before proceeding so as to reduce false positive measurements that can be detected upon start-up. At operation 410, a control signal for activating the heater (i.e., heating element) is generated, and the heater is activated at operation 412.

At operation 414, thermal radiation or IR flux is directed from an optical system to a thermal detector, which generates a temperature signal indicating the temperature of the heating element. The temperature of the heating element is compared to a target temperature at operation 416. When the temperature differential (ΔT) does not satisfy the temperature threshold, the method increases the temperature of the heating element at operation 418, and continues regulating the heater at operation 420 by maintaining activation of the heater control system at operation 406. When, however, the measurement at operation 416 indicates that (ΔT) satisfies the temperature threshold at operation 422, the control signal is disconnected at operation 424 and the heater is deactivated at operation 426. Accordingly, the method exits the heater control algorithm 404 to return to the idle mode 402.

Figure 7:
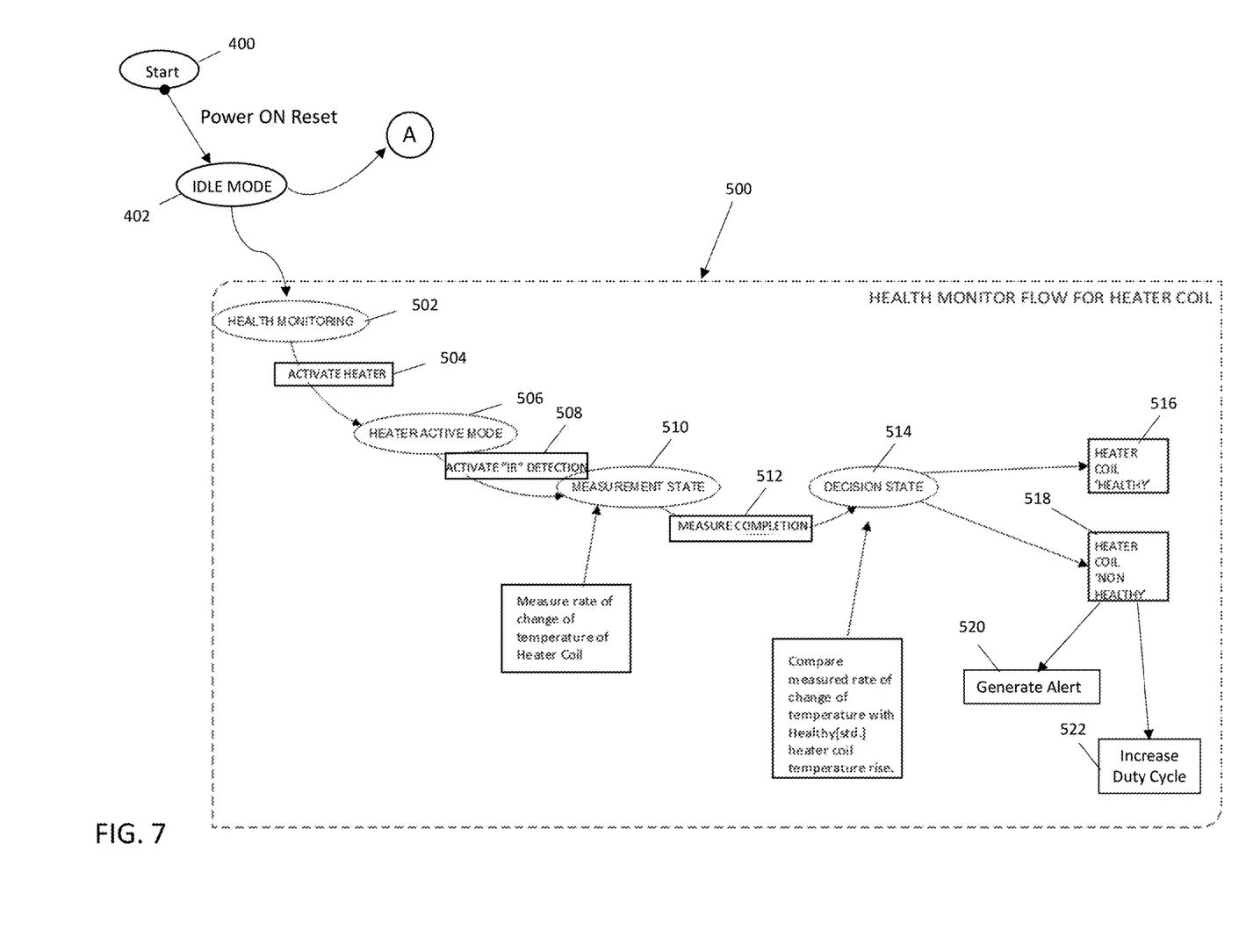
FIG. 7 is a flow diagram illustrating a method of diagnosing an air data sensor installed on an aircraft according to a non-limiting embodiment.

With reference now to FIG. 7, a method of diagnosing an air data sensor installed on an aircraft is illustrated according to a non-limiting embodiment. The method begins in a similar manner as described above with reference to FIG. 6. For instance, the method begins at operation 400, and proceeds to an idle mode 402 after initial power on reset of the air data sensor. At the idle mode 402, the method determines whether to invoke the heater diagnostic algorithm 500 or the heater control algorithm 404 (see FIG. 6). When the heater diagnostic algorithm 500 is invoked, the method proceeds to operation 502 and initializes the heater diagnostic algorithm at operation 502, and activates the heater (i.e., the heating element) at operation 504 by generating a control signal for activating the heater (i.e., heating element) so as to emit heat from the heating element at operation 506. At operation 508, thermal radiation or IR flux of the emitted heat is directed from an optical system to a thermal detector. At operation 510, a temperature change rate of the heating element is determined. The temperature change rate can be determined by monitoring the rate in temperature change of the emitted heat starting from a first time period at which the heat element is initially activated to a second time period at which the temperature signal reaches a target temperature at operation 512. At operation 514, the temperature change rate is compared to a target temperature change rate to determine a temperature change rate differential. When the temperature change rate differential satisfies the differential threshold, the heating element is determined to be healthy and operating normally as expected at operation 516. When, however, the temperature change rate differential fails to satisfy the differential threshold, the heating element is determined to faulty at operation 518. In this event, the method generates an alert at operation 520 and/or increases the current flowing through the heating element at operation 522 so as to compensate for a reduced capability of the heating element to emit heat.

As described herein, a heater control system is provided which utilizes the detected IR heat of the heat emitted from a heating element coupled to probe to dynamically or actively control the operation of the heating element. Accordingly, the heater control system can determine more precisely when to energize heating element and how much heat should be emitted by the heating element at given environmental conditions and temperature to improve heating efficiency and optimizing power consumption. The heater control system also provides diagnostics operations capable of determining the onset of a degrading heating element. In this manner, the heater control system can more accurately identify a faulty heating element, while also avoiding preemptive maintenance and/or replacement of the heating element.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A heater control system for an aircraft, the heater control system comprising:
   an air data sensor including a probe and transducer coupled to the probe;
   a heating element disposed within the probe and configured to emit heat that heats the probe;
   a thermal sensor system in operable communication with the air data sensor and configured to determine a temperature of the heating element based on a thermal radiation of heat released from a surface of the probe; and
   a controller in operable communication with the thermal sensor system and the heating element, the controller configured to control power supplied to the heating element to vary the emitted heat based on the thermal radiation,
   wherein the thermal sensor system comprises:
   an optical unit configured to direct and focus infrared radiation flux of the heat released from the surface of the probe; and
   a thermal detector configured to receive the infrared radiation flux from an optical unit, and to output a temperature signal indicative of the temperature of the heating element based on the infrared radiation flux.

2. The heater control system of claim 1, wherein the heating element is embedded in the probe and is configured to emit the heat in response to an electrical current flowing through the heating element.

3. The heater control system of claim 1, wherein the controller activates the heating element in response to a temperature difference (ΔT) between the temperature signal and a target temperature value exceeding a temperature error threshold value, and deactivates the heating element in response to the temperature difference being equal or less than the temperature error threshold value.

4. The heater control system of claim 3, wherein controller receives a secondary ice detection signal independent from the temperature signal, and activates the heating element in response to receiving the secondary ice detection signal.

5. A method of heating an air data sensor operable with an aircraft, the method comprising:
   outputting, via a thermal sensor system in operable communication with a heating element disposed within a probe of an air data sensor, a temperature signal indicative of a temperature of the heating element based on a thermal radiation of heat released from a surface of the probe;
   controlling power supplied to the heating element, via a controller, to vary the emitted heat based on the temperature signal,
   wherein outputting the temperature signal comprises:
   directing and focusing, via an optical unit, infrared radiation flux of the heat released from the surface of the probe to a thermal detector; and outputting, via the thermal detector, the temperature signal indicative of the temperature of the heating element based on the infrared radiation flux.

6. The method of claim 5, wherein the heating element includes an electrically resistive heating element, and wherein varying the emitted heat further comprises varying a strength of electrical current flowing through resistive heating element.

7. The method of claim 5, wherein varying the emitted heat further comprises:
flowing the electrical current through the heating element in response to a temperature difference ($\Delta T$) between the temperature signal and a target temperature value exceeding a temperature error threshold value; and
disconnecting the electrical current to heating element in response to the temperature difference being equal or less than the temperature error threshold value.

8. The method of claim 7, further comprising:
outputting a secondary ice detection signal to the controller independently from outputting the temperature signal; and
flowing the electrical current through the heater element in response to receiving the secondary ice detection signal at the controller.

* * * * *